United States Patent
Anderson et al.

(10) Patent No.: US 7,725,679 B1
(45) Date of Patent: May 25, 2010

(54) DISTRIBUTED ARRAYS IN PARALLEL COMPUTING ENVIRONMENTS

(75) Inventors: Penelope Anderson, Newton, MA (US); Cleve Moler, West Newbury, MA (US); Jos Martin, Burwell (GB); Loren Shure, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 188 days.

(21) Appl. No.: 11/173,645

(22) Filed: Jun. 30, 2005

Related U.S. Application Data

(63) Continuation-in-part of application No. 10/940,152, filed on Sep. 13, 2004.

(51) Int. Cl.
*G06F 15/76* (2006.01)

(52) U.S. Cl. ...................................... 712/10
(58) Field of Classification Search ............ 712/10
See application file for complete search history.

(56) References Cited

U.S. PATENT DOCUMENTS

| | | | | |
|---|---|---|---|---|
| 4,174,514 A | * | 11/1979 | Sternberg | 382/303 |
| 5,021,947 A | * | 6/1991 | Campbell et al. | 712/25 |
| 5,133,073 A | * | 7/1992 | Jackson et al. | 712/12 |
| 5,159,690 A | * | 10/1992 | Margolus et al. | 712/17 |
| 5,625,832 A | * | 4/1997 | Ohsawa et al. | 712/28 |
| 5,644,749 A | * | 7/1997 | Obayashi | 711/220 |
| 5,659,778 A | * | 8/1997 | Gingold et al. | 712/11 |
| 5,737,623 A | * | 4/1998 | Liebrock | 712/13 |

OTHER PUBLICATIONS

Husbands. Parry Jones Reginald, "Interactive Supercomputing," pp. 1-96 (1999).*

Husbands, Parry Jones Reginald, "Interactive Supercomputing," pp. 1-96 (1999).

* cited by examiner

*Primary Examiner*—Eddie P Chan
*Assistant Examiner*—Jacob Petranek
(74) *Attorney, Agent, or Firm*—Lahive & Cockfield, LLP; Kevin J. Canning

(57) ABSTRACT

The present invention provides a method and system to implement a distributed array using the distributed property as an attribute attachable to an array. The present invention maintains the top level array implementation so as to avoid making the top level users to learn how to use a brand new class for creating and manipulating distributed arrays.

11 Claims, 4 Drawing Sheets

DISTRIBUTED ARRAYS IN PARALLEL COMPUTING ENVIRONMENTS

RELATED APPLICATION

This patent application is a continuation-in-part application of, and claims the benefit of, U.S. patent application Ser. No. 10/940,152 filed on Sep. 13, 2004, entitled "METHODS AND SYSTEM FOR EXECUTING A PROGRAM IN MULTIPLE EXECUTION ENVIRONMENTS".

TECHNICAL FIELD

The present invention generally relates to parallel computing. More particularly, the present invention relates to distributed arrays in the parallel computing environment.

BACKGROUND INFORMATION

MATLAB® is a product of The MathWorks, Inc. of Natick, Mass., which provides engineers, scientists, mathematicians, and educators across a diverse range of industries with an environment for technical computing. MATLAB® is an intuitive high performance language and a technical computing application that provides mathematical and graphical tools for mathematical computation, data analysis, visualization and algorithm development. As a desktop application, MATLAB® typically runs on a single computer. However, there is a limit to the complexity and the size of a problem that a single computer can solve. For example, for a data intensive program utilizing a few 1000 by 1000 arrays, there might not be enough processing power on the single computer to manipulate these arrays, or the program might take days to complete execution. Furthermore, there might not be enough memory on a processor to store one or more of the arrays needed for a data intensive program.

With many engineering and scientific problems requiring larger and more complex modeling, many scientists and engineers are interested in using parallel computing to solve their problems. Therefore, it is desirable to provide a user-friendly technique to employ parallel computing in a technical computing environment.

SUMMARY OF THE INVENTION

The present invention relates in general to parallel computing in a technical computing environment. Specifically, the present invention is related to distributed arrays in parallel computing. Different user-interface or syntax implementations may give users a different feel and experience. The present invention provides a user-friendly implementation of distributed arrays. The present invention provides a method to make changes to the current implementations of arrays to incorporate the use of distributed arrays while maintaining most of the user-familiar syntaxes of an array. An attribute is employed to indicate the distributed property of an array. The distributed attribute may be applied to any array, such as arrays of basic classes like double, single, int8, and logical, or special arrays like structure arrays and cell arrays. The present invention provides the users the convenience to create and manipulate a distributed array as they would do with a regular array without learning a new class. For example, a distributed double array may be created by creating a double array with a pre-defined attribute indicating the distributed property of the array.

In one aspect of the present invention, a method for programmatically creating a distributed array for processing in a parallel computing environment is introduced. The method includes the step of providing a first parallel computing unit and a second parallel computing unit. The method also includes the step of identifying a first array residing on the first parallel computing unit and a second array residing on the second parallel computing unit. The method further includes the step of forming a distributed array by grouping the first array and the second array. In one embodiment of the present invention, the method further includes the step of determining a dimension over which to group the first array and the second array. In another embodiment of the present invention, the method further includes the step of redistributing the distributed array across the multiple parallel computing units. In still another embodiment of the present invention the first array and the second array does not have the same dimension with each other. In yet another embodiment of the present invention, the multiple parallel computing units are processors.

In another aspect of the present invention, a method for programmatically converting a local array to a distributed array for processing in a parallel computing environment is provided. The method includes the step of providing a first parallel computing unit and a second parallel computing unit. The method also includes the step of identifying an array for distributing across the first and second parallel computing units. The method further includes the step of creating a distributed array using the identified array, wherein the distributed array has an attribute that identifies a distributed property of the distributed array. In one embodiment of the present invention, the identified array is identified using a variable name. In another embodiment of the present invention, all the parallel computing units have an array with the variable name. In still another embodiment of the present invention, only one parallel computing unit has an array with the variable name. In yet another embodiment of the present invention, the method further includes the step of determining a dimension over which to distribute the identified array.

In still another aspect of the present invention, a medium in an electronic device storing computer executable instructions for a method programmatically creating a distributed array for processing in a parallel computing environment is provided. The method includes the step of providing a first parallel computing unit and a second parallel computing unit. The method also includes the step of identifying a first array residing on the first parallel computing unit and a second array residing on the second parallel computing unit. The method further includes the step of forming a distributed array by grouping the first array and the second array.

In yet another aspect of the present invention, a medium in an electronic device storing computer executable instructions for a method programmatically converting a local array to a distributed array for processing in a parallel computing environment is provided. The method includes the step of providing a first parallel computing unit and a second parallel computing unit. The method also includes the step of identifying an array for distributing across the first and second parallel computing units. The method further includes the step of creating a distributed array using the identified array, wherein the distributed array has an attribute that identifies a distributed property of the distributed array.

In still another embodiment of the present invention, a system for programmatically forming a distributed array for processing in a parallel computing environment is introduced. The system includes an application providing a parallel computing environment. The system also includes a first parallel computing unit and a second parallel computing unit both executing in the parallel computing environment. The system further includes a first array stored on the first parallel computing unit and a second array stored on the second parallel computing unit. The system also includes a function for grouping the first array and the second array to form a distributed array. In one embodiment of the present invention, the system further includes a distribution scheme for re-distributing the distributed array.

In yet another embodiment of the present invention, a system for programmatically creating a distributed array for processing in a parallel computing environment is provided. The system includes an application providing parallel computing environment. The system also includes a first parallel computing unit executing and a second parallel computing unit both executing in the parallel computing environment. The system further includes an array identified for distributing across the first and second parallel computing units. The system also includes a distribution scheme for distributing the identified array to form a distributed array with a pre-defined attribute, wherein the pre-defined attribute indicates a distributed property of the distributed array. In one embodiment of the present invention, the system further includes a function for querying the distribution scheme. In another embodiment of the present invention, the system further includes a function for querying a dimension over which the distributed array is distributed. In still another embodiment of the present invention, the system further include a function for querying a class category of the distributed array, wherein the function returns a result based on a class category of data contents of the distributed array. In yet another embodiment of the present-invention, the identified array is identified by a variable name. In still another embodiment of the present invention, all the parallel computing units have an array with the variable name. In yet another embodiment of the present invention, only one of the parallel computing units has an array with the variable name.

The details of various embodiments of the invention are set forth in the accompanying drawings and the descriptions below.

BRIEF DESCRIPTION OF THE DRAWINGS

The foregoing and other objects, aspects, features, and advantages of the invention will become more apparent from the following description and accompanying drawings, in which like reference characters refer to the same parts throughout the different views.

DETAILED DESCRIPTION

Figure 1:
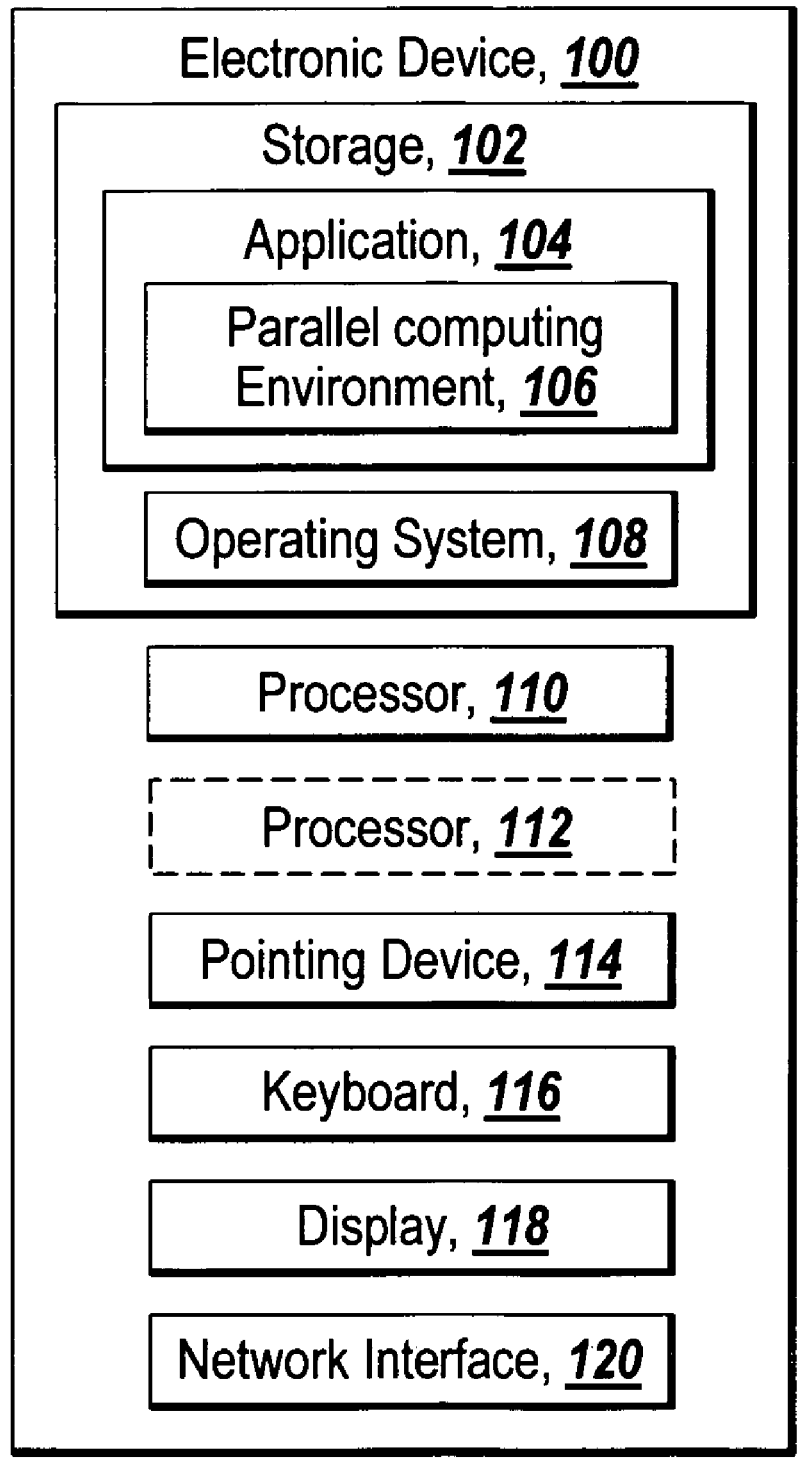
FIG. 1 is an exemplary electronic device that is suitable for practicing one embodiment of the present invention.

The present invention provides a system and method for executing a distributed array in a parallel computing environment. In one aspect, the present invention is related to a method to execute a computer program in multiple execution environments. For a computer program utilizing a distributed array, the distributed array is distributed across the multiple execution environments and each execution environment handles execution and calculation only on a portion of the distributed array. This provides an easy method for parallel processing of a distributed array executing on multiple computers and/or multiple processors to leverage the computing power of multiple computing resources. This is done without requiring the user of the parallel computing environment to understand how to program parallel programming paradigms. A program written to be run sequentially in the execution environment is run in parallel in multiple environments with little or no changes to the program.

With the availability of parallel computers, such as Beowolf clusters, researchers and scientists are interested in parallel computing in a technical computing environment, such as MATLAB®. Arrays are an integral part of technical computing and with distributed arrays, a user can employ more computing resources than a single computer. However, the implementation of the distributed arrays can affect the complexity of a computer program and how a user feels about using such distributed arrays for problem solving. With identical low level parallel programming paradigms, different top level programming syntaxes can result in very different user experience.

In U.S. application Ser. No. 10/940,152, a distributed array implementation for a parallel version of MATLAB designated as "Parallel MATLAB®" was introduced. A distributed array with variable name A and size 1024 by 1024 can be created by using a special class called darray with the following statement in Parallel MATLAB®.

A=darray (1024, 1024)

Distributed array A subsequently is saved in the current workspace and may be viewed via the MATLAB® workspace browser. The MATLAB® workspace holds a set of named variables built up during a MATLAB® session. Additional variables may be added to the workspace by using functions, running M-files, and loading saved workspaces. The MATLAB® workspace browser shows the name, value, size, and class of each variable. This feature provides a user the convenience of looking up properties of a variable that has been previously declared and used.

The MATLAB® workspace browser can display the name, value, size and class of the distributed array A in this example. However, with the distributed array A having a class of darray, darray is the only property that the MATLAB® workspace browser shows. Thus, a user cannot determine the data type that is utilized in the data content of the distributed array A. A user also cannot determine other existing properties, such as sparsity or complexity of the distributed array A in the MATLAB® workspace browser. Other methods need to be employed to query or look up the data type and properties of the data contents within the distributed array A. Currently the existing class function and the class query functions (such as isa( ), isfloat( ), isnumeric( ), iscell( )) would not yield expected results with this implementation of distributed arrays because the properties of the distributed array are only revealed when one inspects the underlying data and not the distributed array as a whole. Hence, this implementation of distributed arrays using a special class may be cumbersome for users. For example, a first developer may decide to utilize distributed arrays using the above-described class implementation to complete a portion of a project and upon completion, a second developer may continue to work on other portions of the unfinished project. The second developer may encounter a distributed array but may require additional effort to identify what data precision is used with this distributed array. Additionally, even for the first developer, it is possible that there may be too many distributed arrays used in the project to remember the class and data precision of the data utilized in each of the distributed arrays. Consequently, it may become cumbersome for the first user to keep track of the data precision and data type of the underlying data that is utilized in each array.

The present invention solves the above-mentioned problems by using an attribute to indicate the distributed property of a distributed array instead of implementing a new class for the distributed array. An attribute in programming languages generally describes an abstract property of an entity. The value of an attribute indicates whether an entity has the corresponding abstract property. This implementation of a distributed array allows the look and feel of a distributed array to be similar to most of the existing syntaxes of an array and does not require a user to learn how to use a new class in order to employ a distributed array.

The illustrated embodiments will be described for illustrative purposes relative to a MATLAB® based application, however one of ordinary skill in the art will appreciate that the present invention may be applied to parallel execution of other applications such as LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

FIG. 1 illustrates an exemplary electronic device that is suitable for practicing an illustrative embodiment of the present invention. Electronic device 100 includes a storage 102, such as a hard drive or CD-ROM, for storing application 104 and operating system 108. Electronic device 100 may be any computer system such as a desktop computer, laptop, workstation, server, handheld computer, or other form of computing or telecommunication device that is capable of communication and that has sufficient computing power to perform the operations described herein. Electronic device 102 further includes a display 118 which a user may interact with electronic device 102 using I/O devices such as a keyboard 116 and a pointing device 114 such as a mouse or stylus. A first processor 110 and optionally a second processor 112 are utilized by electronic device 100 for running operating system 108, application 104, and other software in storage 102. One of ordinary skill in the art will appreciate that first and second processors 110 and 112 may be replaced by other hardware component with computational capability, such as a microcontroller, application specific integrated circuit, field-programmable gate arrays or the like.

Application 104 provides a parallel computing environment 106 that allows parallel processing of application 104 on the first and second processors 110 and 112. Application 104 is illustrated here as Parallel MATLAB® or a MATLAB® based application that is suitable for parallel or distributed processing. However, one of ordinary skill in the art will appreciate that the present invention may apply to other technical computing that is suitable for parallel or distributed processing. Electronic device 100 may further include a network interface 120 to interface to a Local Area Network (LAN), Wide Area Network (WAN), or the Internet through a variety of connections including, but not limited to, standard telephone lines, LAN or WAN links, broadband connections, wireless connections, or some combination of any or all of the above. The network interface 120 allows electronic device 100 to interface with another electronic device that is capable of executing in the parallel computing environment to allow parallel processing on multiple electronic devices.

Figure 2A:
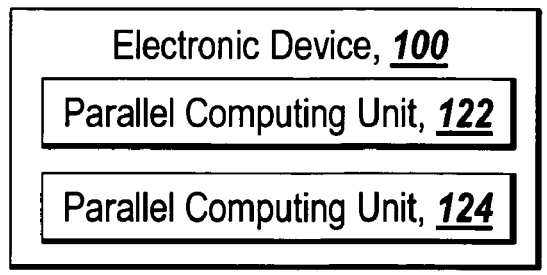
FIG. 2A is a block diagram of an exemplary distributed computing environment that is suitable to practice an embodiment of the present invention in a single electronic device.

FIG. 2A illustrates a tightly coupled environment that is suitable for practicing the present invention. Electronic device 100 includes a first parallel computing unit 122 and a second parallel computing unit 124. In this embodiment, a parallel computing unit may be a processor or other hardware component with computational capability, such as a microcontroller, application specific integrated circuit, or field-programmable gate arrays.

Figure 2B:
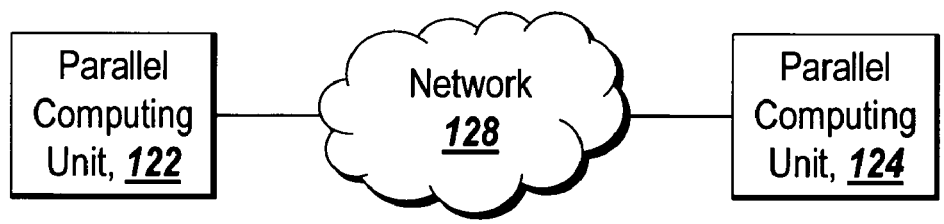
FIG. 2B is a block diagram of another exemplary distributed computing environment that is suitable to practice one embodiment of the present invention via a network.

FIG. 2B illustrates another embodiment that is suitable to practice another exemplary parallel computing environment of the present invention. First parallel computing unit 122 communicates with second parallel computing unit 124 via network 128 such as a LAN, WAN, or wireless network. In this embodiment, a parallel computing unit may be an electronic device such as electronic device 100, a cluster of workstations or the like. One of ordinary skill in the art will appreciate that a distributed computing environment may comprise of a combination of both embodiments illustrated in FIG. 2A and FIG. 2B.

In either of the embodiments shown in FIG. 2A and FIG. 2B, the first parallel computing unit 122 manages a first execution environment and the second parallel computing unit 124 manages a second execution environment. Each execution environment has its local copy of a computer program that is executed in the corresponding parallel computing unit, so there is no main parallel computing unit that distributes executions to the other parallel computing units.

The first execution environment and second execution environment are capable of communicating to each other via an interface. In an exemplary embodiment, the first execution environment and the second execution environment can communicate to each other by sending messages via a Message Passing Interface (MPI). MPI is a de facto standard for communication among the nodes running a parallel program on a distributed memory system. Implementation of the MPI specification permits programs with separate address spaces to synchronize with one another and move data from the address space of one process to that of another by sending and receiving messages. In another embodiment, the first and second execution environments may interface via socket based communications over TCP/IP implementing a custom message specification or other available message communications projects that allow the execution environments to send and receive messages.

A distributed array is implemented such that the executions of the distributed array are distributed among the multiple execution environments. Each of the parallel computing units stores locally a portion of the data contents of the distributed array. The multiple execution environments know which portion of the distributed array is stored on which of the multiple parallel computing units. A parallel computing unit performs execution only on the portion of the distributed array that is stored locally and if the parallel computing unit needs some portion of the distributed array that is not stored locally, it can send a message to other parallel computing units to request for the information needed.

In order to employ the distributed property of an array as an attribute for the example of Parallel MATLAB®, there are a few changes that need to be made to the underlying structure of how an array is described in MATLAB® to make Parallel MATLAB® work. For example, a number of functions and methods are added to facilitate the implementation of distributed arrays described herein. These functions will be described in more detail below.

While working with distributed arrays, it is useful to have a function that a user can query which portion of a distributed array is on which one of the multiple parallel computing units. In the example of Parallel MATLAB®, one such function called dcolon is implemented for this purpose. The dcolon function signature look likes the following:

dcolon (a, d, b, mypid, nprocs)

The dcolon function works similar to the colon(":") operator in MATLAB®. Given a colon operator example, if a=2 and b=10; then the expression a:b or a:1:b is a vector containing integers from 2 to 10 a denotes the starting number and b denotes the ending number in the evenly distributed vector with a unit spacing. For a vector with non-unit spacing, a spacing d is specified:

a:d:b

The dcolon function takes in arguments of a starting number a, spacing d, and ending number b of a vector. a and b also denotes the starting and ending indexes of the dimension over which the distributed array is distributed. The dcolon function also takes in arguments that specify the parallel computing unit identification number (mypid) and the number of total parallel computing units (nprocs). One of ordinary skill in the art will appreciate that dcolon, a, b, d, mypid, nprocs are merely function or variable names and should not be used to limit the scope of the present invention. The dcolon function attempts to put an equal amount of data contents on each of the parallel computing units and returns a vector that lists the indexes that indicate the portion of the distributed array that is stored locally in the parallel computing unit whose identification number is given as one of the arguments to the dcolon function. For example, given a distributed array of size 5×16 and the parallel computing units are processors, a user can query which portion of the distributed array is on processor 2 with a total of 4 processors to distribute the distributed array over the second dimension (column) using the following statement.

>>dcolon (1, 1, 16, 2, 4)
    ans=5 6 7 8

The above dcolon statement yields that the $5^{th}$ to $8^{th}$ column of the array is local to processor 2. Although the dcolon function is discussed here using an even distribution scheme, one of ordinary skill in the art will appreciate that there are other distribution schemes other than even distribution that may be utilized with the present invention. Additionally, one of ordinary skill in the art will also appreciate that a distributed array may be distributed across more than one dimension. For example, a 4000 by 4000 array may be distributed over both dimensions and the resulting distributed array are consists of four 2000 by 2000 blocks. The dcolon function may be modified to adopt to different distribution schemes or other functions may be added to provide other distribution methods. For simplicity of discussion, the dcolon function is only described here relative to an even distribution scheme over one dimension.

Given a distributed array, a user may want to query over which dimension the distributed array is distributed. In the example of Parallel MATLAB®, a method called distributor provides this functionality. For example, given a distributed array D, the statement >>dim=distributor(D)
    dim=2 shows that distributed array D is distributed over the second dimension. One of ordinary skill in the art will appreciate that other function names may be used or other functions may be implemented to provide the query method that allows a user to find out over which dimension a distributed array is distributed. Additionally, one of ordinary skill in the art will also appreciate that a variable may be used to store the information about the dimension over which a distributed array is distributed and a function may not be utilized for this purpose.

Given an arbitrary array, a user may want to query if the array is a distributed array. A function called isdistributed is provided for this purpose in Parallel MATLAB®. Furthermore, since the distributed property is implemented as an attribute, when a user queries the class of a distributed array, the returned result displays the class of the underlying data. For example, if D is a distributed uint8 array:

>>class(D) % query the class of distributed array D
    ans=uint8
    >>isdistributed(D) % query if array D is distributed
    ans=1

Implementing the distributed property as an attribute instead of a class has the advantage that in the MATLAB® workspace browser, the class of the distributed array shows the class of the underlying data and therefore the present invention provides a convenient and familiar way for a user to look up data precision utilized in the data content of a distributed array. Additionally, when a user uses the whos function to show all the variables in the current workspace, the attributes of each array will also be shown. Besides the existing MATLAB® attributes, global, complex, and sparse, a new attribute "distributed" is displayed if an array is a distributed array. Additionally, implementing the distributed properties of an array as an attribute also provides many programmatic advantages. Currently the existing class function and the class query functions in MATLAB® can be used normally and the functions can output results as expected.

The class of a distributed array may be changed using the technique of casting. Casting or typecasting in programming languages refers to changing an entity of one data type into another. As an example with fundamental data types, a double could be cast as an integer, where the data beyond the decimal point is ignored. On the other hand, an integer could be cast as a double with zeros being placed after the decimal point. However, no additional information is added with casting, but sometimes information will be deleted or ignored with casting.

Casting a distributed array changes the class of the underlying data of the distributed array, but the distributed attribute stays unchanged. For example:

>>U32=uint32(D);
    >>class(U32)
    ans=uint32
    >>isdistributed(U32)
    ans=1
    >>I32=cast(U32, 'int32'); % changing class
    >>class(I32)
    ans=int32
    >>isdistributed(I32) % distributedness is unchanged
    ans=1

A distributed array may be packaged into a cell or struct array. An array may be packaged into a cell array using { } indexing or a struct array using indexing. However, the resulting cell array or structure array may not have the distributed property, even though some of the contents of the cell array or structure array are distributed. For example:

>>isdistributed (D) % assume D is a distributed array
    ans=1
    >>C={D}; % D is packed into a cell array C
    >>isdistributed (C) % C is not a distributed array

```
ans=0
>>isdistributed (C{1}) % part of C is a distributed array
ans=1
>>S.field=D; % D is packed into a structure array
>>isdistributed(S) % S is not a distributed array
ans=0
>>isdistributed(S.field) % part of S is distributed
ans=1
```

One of ordinary skill in the art will appreciate that the cell arrays and struct arrays may also be distributed arrays, and that it is possible to have a nested distributed array, such as a distributed cell array with some or all of the contents being also distributed. The non-distributed cell and struct array given above are merely examples to show that an array itself may not have the distributed property even though some of the contents of the array may be distributed.

In the example of Parallel MATLAB®, a function called dcreate is implemented so that a distributed array may be formed using existing local arrays on the multiple parallel computing units. Suppose that a non-distributed array A is present on all of the parallel computing units and the class and sparsity of all the As agree, then if the size of A on each of the parallel computing units agree in all dimensions or disagree in only one dimension, these array As can be grouped together to form a distributed array. If the size of all the array As agree, then they may be grouped using any dimension. However, if the size of all the array As disagree in only one dimension, then they may be grouped only in the dimension that does not agree. For example, A on each processor has the size that looks like the following Parallel computing unit 1: 2 by 3 by 4
Parallel computing unit 2: 2 by 2 by 4
Parallel computing unit 3: 2 by 7 by 4

We can create a distributed array D by grouping these non-distributed arrays over the second dimension using the following statements

```
>>dim=2; % the dimension to group the arrays
>>D=dcreate (A, dim); % grouping the arrays
```

However, in the process of forming a distributed array D, the existing distribution of the data does not align with what the dcolon function yields, therefore, some reshuffling of the data is done so that data distribution agrees with what the dcolon function yields. Hence, on each of the parallel computing unit, the resulting local portion of the distributed array is of size 2 by 4 by 4. An inverse function called local of dcreate may be implemented to ungroup these local portions of the distributed array. However, if the dcreate function needs to reshuffle the data among the parallel computing units so that the data distribution agrees with what the dcolon function yields, then the local function will only ungroup the resulting local portions of the distributed array. In other words, the local function does not necessarily ungroup the distributed array in such a way that yields the original local arrays.

The present implementation of a distributed array in Parallel MATLAB® uses the dcolon function to determine how a distributed array should be distributed therefore any formations or creations of distributed arrays follow the distribution scheme determined by the dcolon function. However, one of ordinary skill in the art will appreciate that modifications may be made to the dcolon function to allow for non-even distribution of a distributed array or other functions may be utilized to determine the distribution scheme of a distributed array. Furthermore, modifications to the dcolon function or addition of other functions may allow the dcreate function to work without reshuffling of the data to make the resultant distributed array to be evenly distributed among the multiple parallel computing units.

The present invention provides a function that can convert a local array to a distributed array. In the present implementation of Parallel MATLAB®, a local array can be converted to a distributed array using the distribute function. For example, an array A exists on only one of the parallel computing units, the statement D=distribute (A) or D=distribute (A, dim)

creates a distributed array D distributed along a default dimension or a specified dim$^{th}$ dimension. The above statements may also be used to distribute an array A if all of the parallel computing units have a local array with identical name A, size, class and sparsity. The data contents of each of the local arrays A may or may not be identical in this case, but the size of the arrays must agree in all dimensions. If A exists in more than one parallel computing unit but not all of the parallel computing unit or if the size of all the A are not identical in all of the parallel computing units, then the distribute function returns an error.

The distribute function may be used further to redistribute a distributed array over another dimension. The statements

```
>>new dim=1;
>>D1=distribute (D, new dim);
``` represent the re-distribution of D over the first dimension to form a resultant distributed array D1. An inverse function of the distribute function may be implemented to undistribute a distributed array. The undistributed array may be either a private array that exists on only one parallel computing unit or a replicated array that exists on all of the parallel computing units. One of ordinary skill in the art will appreciate that other functions with different function names may be implemented to perform each of the different functions the distribute function does here, however the scope of the present invention should not be limited to the exact implementations mentioned in this application.

Figure 3:
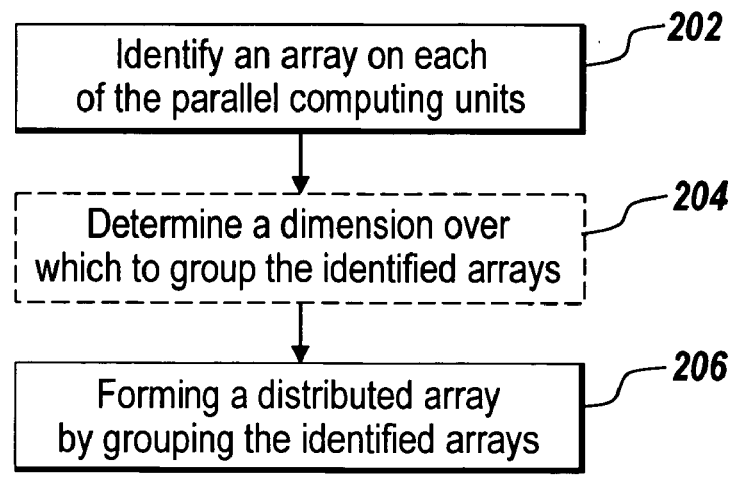
FIG. 3 is a flow diagram illustrating steps performed to create a distributed array in an embodiment of the present invention.

FIG. 3 shows the steps performed in forming a distributed array as described in the dcreate function. Initially, parallel computing units are provided. An array is identified on each of the parallel computing units (step 202). A user or application 104 determines a dimension over which to group and combine the identified arrays (step 204). A distributed array is formed in the parallel computing environment 106 by grouping the identified arrays (step 206).

Figure 4:
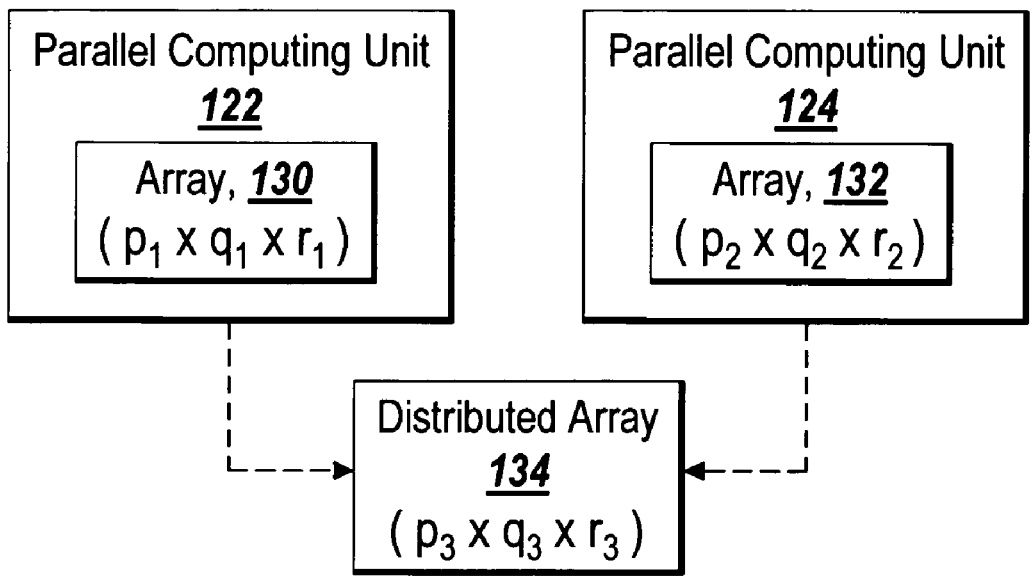
FIG. 4 is an example of how a distributed array is created using the method presented in FIG. 3.

FIG. 4 illustrates an example. First parallel computing unit 122 and second parallel computing unit 124 are provided in the parallel computing environment. Array 130 and array 132 are identified in the first parallel computing unit 122 and the second computing unit 124, respectively. Assuming that Array 130 has a size of $p_1 \times q_1 \times r_1$ and array 132 has a size of $p_2 \times q_2 \times r_2$. If the first and third dimension of arrays 130 and 132 are the same ($p_1=p_2$ and $r_1=r_2$), array 130 and array 132 may be grouped and combined over the second dimension to form a distributed array 134 with a size of $p_3 \times q_3 \times r_3$, where $p_3=p_1=p_2$, $r_3=r_1=r_2$ and $q_3=q_1+q_2$. The first portion of the distributed array 134 resides in first parallel computing unit 122 and may have the same size and content as array 130. The second portion of the distributed array 134 resides in second parallel computing unit 124 and may have the same size and content as array 132. Calculations involving the first portion of the distributed array 134 are mainly performed on the first parallel computing unit 122 and calculations involving the second portion of the distributed array 134 are mainly performed on the second parallel computing unit 124. A user or application 104 may redistribute distributed array 134 so that the portions residing on first and second parallel computing units follows a rule, such as even distribution by data size, balanced distribution by computing power, or based on optimal performance of the overall program that utilizes distributed array 134. One of ordinary skill in the art will appreciate that FIG. 4 is merely an example, and a distributed array may be formed by grouping any number of arrays. The arrays may have dimensions other than three as shown in FIG. 4, and the arrays may be grouped and combined over a dimension other than the second dimension.

Figure 5:
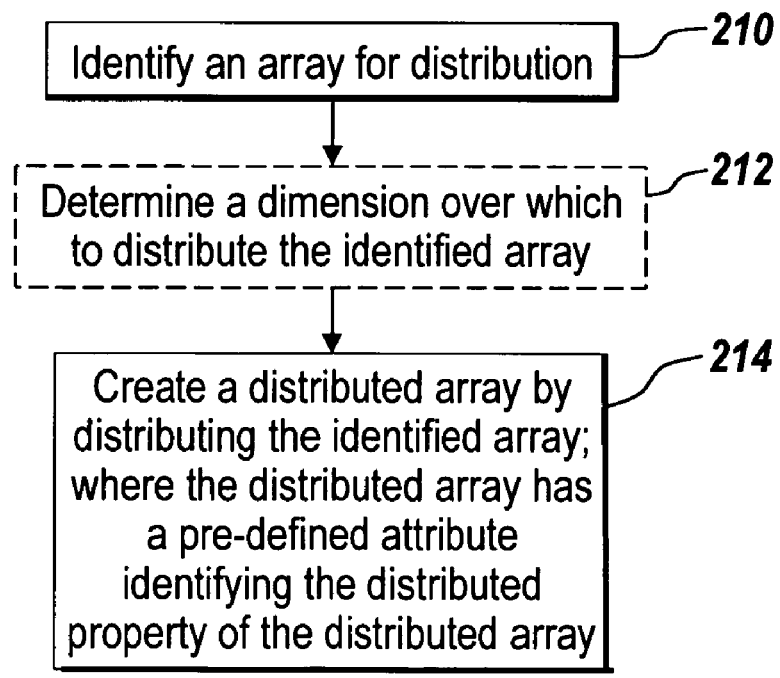
FIG. 5 is a flow diagram illustrating steps performed to convert a regular array to a distributed array in an embodiment of the present invention.

FIG. 5 illustrates the steps taken to create a distributed array using the distribute function. After providing the parallel computing units, an array is identified for distribution across the parallel computing units (step 210). A user or application 104 may determine the dimension over which to distribute the identified array (step 212). A default dimension may be used if no dimension is specified by the user or application 104. A distributed array is created using the identified array and the distributed array has a pre-defined attribute that identifies the distributed property of the distributed array (step 214).

Figure 6A:
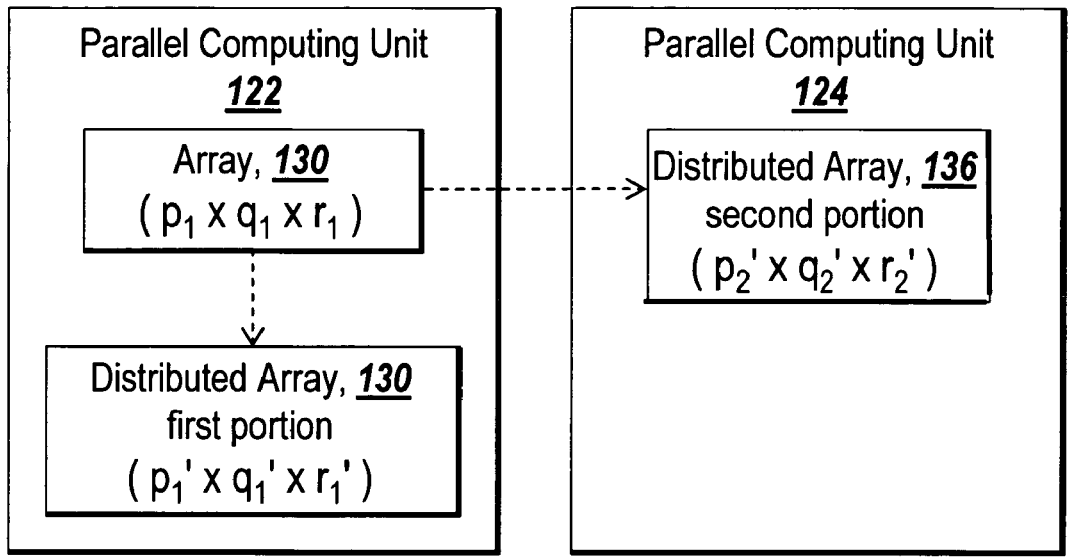
FIG. 6A is an example of how a distributed array is created from a private array using the method presented in FIG. 5.

Two examples are given to more clearly illustrate the steps of FIG. 5. FIG. 6A illustrates an example where a private array is identified for distribution. A private array is an array with a unique variable name that only exists in one parallel computing unit. First parallel computing unit 122 and second parallel computing unit 124 are provided to execute in the parallel computing environment. Private array 130 is identified as the array to be distributed (see step 210 of FIG. 5). Assuming that first parallel computing unit 122 has private array 130 with a size of $p_1 \times q_1 \times r_1$. A user may choose to distribute private array 130 over the second dimension (see step 212 of FIG. 5). One of ordinary skill in the art will appreciate that an array with n dimensions may be distributed over any of the n dimensions. In the example of Parallel MATLAB®, private array 130 is distributed among all the parallel computing units following the distribution scheme determined by the dcolon function. One of ordinary skill in the art will appreciate that there are many ways that one can distribute an array. Distributed array 136 is created by distributing the private array 130 among the parallel computing units 122 and 124. Distributed array 136 has a pre-defined attribute that identifies the distributed property (see step 214 of FIG. 5). A first portion of distributed array 136 resides in parallel computing unit 122 and a second portion of distributed array 136 resides in parallel computing unit 124. Assuming that the first portion of the distributed array 136 has a size of $p_1' \times q_1' \times r_1'$ and the second portion of the distributed array 136 has a size of $p_2' \times q_2' \times r_2'$. Since private array 130 is distributed over the second dimension to create the distributed array 136, then the first and third dimension of the distributed array 136 stays the same as private array 130 ($p_1'=p_2'=p_1$, $r_1'=r_2'=r_1$) and the sum of the second dimensions of all the portions of the distributed array 136 is equal to the second dimension of private array 130 ($q_1'+q_2'=q_1$).

Figure 6B:
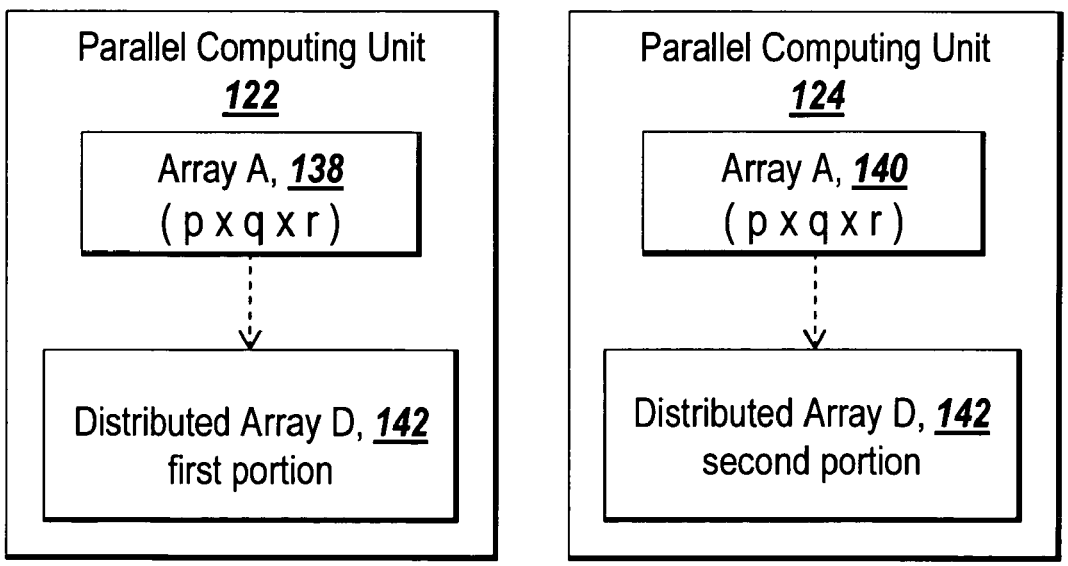
FIG. 6B is an example of how a distributed array is created from local arrays with the same variable names using the method presented in FIG. 5.

In another example as shown in FIG. 6B, an array with the variable name "A" is identified to be distributed. However, parallel computing units 122 and 124 have arrays 138 and 140, respectively, and both array 138 and array 140 have the same variable name "A" but may or may not have the same data values. The present invention allows a distributed array to be created if array 138 and array 140 have the same array size, same variable name, same class and same sparsity. Assume that the newly created distributed array has the variable name "D", then distributed array D 142 is created following the distribution scheme determined by the dcolon function. If array A has the size of p×q×r with p as an even number and given that array A is distributed evenly over the first dimension, then the first portion of distributed array D 142 contains the $1^{st}$ to $(p/2)^{th}$ rows of array A 138 and the second portion of distributed array D 142 contains the $(p/2+1)^{th}$ to $p^{th}$ rows of array A 140. Hence, the whole distributed array D 142 has the same size as array A. One of ordinary skill in the art will appreciate that FIG. 6A and FIG. 6B are given as purely examples and should not be used to limit the scope of the present invention.

One of ordinary skill in the art will appreciate that the present invention has several advantages. A distributed array may be redistributed over a specified dimension. A user may use a function to query the distributed array over which dimension is the array distributed. Alternatively, such information may be one of the properties of the distributed array. A function may allow a distributed array to be undistributed to form a private array on only one parallel computing unit or a replicated array on all of the parallel computing units. A distributed array may also be constructed from scratch and not from existing arrays by changing existing functions such as the zeros and ones functions in MATLAB®. The implementation of distributed arrays as an attribute attached on a regular array present many advantages to top level users of the application. For example, users may continue to create a double array as they have before, but now just need to add a pre-defined distributed attribute to indicate that this array is a double distributed array. Since the distributed property is represented as an attribute, the class of the array stays as a double, which is easy for users to look up what data precision the distributed array is using in the MATLAB® workspace browser. A user does not need to learn how to use a new class to create a distributed array with the present invention. A user will also be able to use the currently existing MATLAB® class function and the class query functions to query the properties of a distributed array and obtain expected results.

Many alterations and modifications may be made to the present invention, especially the implementations of different functions, by those having ordinary skill in the art without departing from the spirit and scope of the invention. Therefore, it must be expressly understood that the illustrated embodiments and listed functions have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for programmatically creating a distributed array for processing in a parallel computing environment, the method comprising:

providing a first parallel computing unit and a second parallel computing unit;

identifying a first non-distributed array residing on the first parallel computing unit, the first non-distributed array having one or more dimensions, wherein each dimension has a value;

identifying a second non-distributed array residing on the second parallel computing unit, the second non-distributed array having one or more dimensions, wherein each dimension has a value, the value of at least one dimension of the second non-distributed array is greater than the value of the corresponding dimension of the first non-distributed array by more than one;

forming a distributed array comprised of a single array, the distributed array formed by grouping the first non-distributed array and the second non-distributed array into the single array, the grouping performed over a distribution dimension, wherein:

when one of the dimensions of the first non-distributed array has a different value than a corresponding dimension of the second non-distributed array, the distribution dimension is the dimension that has the different value, and when the dimensions of the first non-distributed array have values that are the same as values of corresponding dimensions of the second non-distributed array, the distribution dimension is any dimension.

2. The method of claim 1, further comprising:
redistributing the distributed array across the first parallel computing unit and second parallel computing unit.

3. The method of claim 1, wherein the first parallel computing unit and second parallel computing unit are processors.

4. The method of claim 1, further comprising:
indexing the single array, the indexing comprising:
indexing the first non-distributed array as a portion of the single array, and
indexing the second non-distributed array as another portion of the single array.

5. In an electronic device, a medium storing computer executable instructions for programmatically creating a distributed array for processing in a parallel computing environment, the instructions comprising:
instructions for providing a first parallel computing unit and a second parallel computing unit;
instructions for identifying a first non-distributed array residing on the first parallel computing unit, the first non-distributed array having one or more dimensions, wherein each dimension has a value;
instructions for identifying a second array residing on the second parallel computing unit, the second array having one or more dimensions, wherein each dimension has a value, the value of at least one dimension of the second array is greater than the value of the corresponding dimension of the first array by more than one; and
instructions for forming a distributed array comprised of a single array, the distributed array formed by grouping the first non-distributed array and the second array into the single array, the grouping performed over a distribution dimension, wherein:
when one of the dimensions of the first non-distributed array has a different value than a corresponding dimension of the second array, the distribution dimension is the dimension that has the different value, and
when the dimensions of the first non-distributed array have values that are the same as values of corresponding dimensions of the second array, the distribution dimension is any dimension.

6. The medium of claim 5, wherein the instructions further comprise:
instructions for redistributing the distributed array across the first parallel computing unit and second parallel computing unit.

7. The medium of claim 5, wherein the first parallel computing unit and second parallel computing unit are processors.

8. The medium of claim 5, wherein the instructions further comprise:
instructions for indexing the single array, the indexing comprising:
indexing the first non-distributed array as a portion of the single array, and
indexing the second non-distributed array as another portion of the single array.

9. A system for programmatically forming a distributed array for processing in a parallel computing environment, the system comprising:
an application providing a parallel computing environment;
a first parallel computing unit executing in the parallel computing environment;
a second parallel computing unit executing in the parallel computing environment;
a first non-distributed array stored on the first parallel computing unit, the first non-distributed array having one or more dimensions, wherein each dimension has a value;
a second non-distributed array stored on the second parallel computing unit, the second non-distributed array having one or more dimensions, wherein each dimension has a value, the value of at least one dimension of the second non-distributed array is greater than the value of the corresponding dimension of the first non-distributed array by more than one; and
a function for grouping the first non-distributed array and the second non-distributed array into a distributed array comprised of a single array over a distribution dimension, wherein:
when one of the dimensions of the first non-distributed array has a different value than a corresponding dimension of the second non-distributed array, the distribution dimension is the dimension that has the different value, and
when the dimensions of the first non-distributed array have values that are the same as values of corresponding dimensions of the second non-distributed array, the distribution dimension is any dimension.

10. The system of claim 9 further comprising:
a distribution scheme for re-distributing the distributed array.

11. The system of claim 9, wherein the function further indexes the single array, the indexing comprising:
indexing the first non-distributed array as a portion of the single array, and
indexing the second non-distributed array as another portion of the single array.

* * * * *

UNITED STATES PATENT AND TRADEMARK OFFICE
CERTIFICATE OF CORRECTION

PATENT NO. : 7,725,679 B1  Page 1 of 1
APPLICATION NO. : 11/173645
DATED : May 25, 2010
INVENTOR(S) : Penelope Anderson et al.

It is certified that error appears in the above-identified patent and that said Letters Patent is hereby corrected as shown below:

On the Title Page, Item (56), under Other Publications, please delete the duplicate entry "Husbands, Parry Jones Reginald, "Interactive Supercomputing," pp. 1-96 (1999)."

Signed and Sealed this

Twenty-fourth Day of August, 2010

David J. Kappos
*Director of the United States Patent and Trademark Office*